(12) United States Patent
Lee et al.

(10) Patent No.: US 10,257,737 B2
(45) Date of Patent: Apr. 9, 2019

(54) METHOD FOR TERMINAL FOR REPORTING CHANNEL STATUS INFORMATION AND APPARATUS FOR THE METHOD IN WIRELESS COMMUNICATION SYSTEM SUPPORTING CARRIER AGGREGATION

(71) Applicant: LG ELECTRONICS INC., Seoul (KR)

(72) Inventors: Hyunho Lee, Seoul (KR); Suckchel Yang, Seoul (KR); Seungmin Lee, Seoul (KR); Hanjun Park, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/529,962

(22) PCT Filed: Dec. 9, 2015

(86) PCT No.: PCT/KR2015/013459
§ 371 (c)(1),
(2) Date: May 25, 2017

(87) PCT Pub. No.: WO2016/093618
PCT Pub. Date: Jun. 16, 2016

(65) Prior Publication Data
US 2017/0359745 A1  Dec. 14, 2017

Related U.S. Application Data

(60) Provisional application No. 62/089,258, filed on Dec. 9, 2014, provisional application No. 62/204,455, filed on Aug. 13, 2015.

(51) Int. Cl.
*H04W 24/10* (2009.01)
*H04W 72/14* (2009.01)
(Continued)

(52) U.S. Cl.
CPC .............. *H04W 24/10* (2013.01); *H04L 1/00* (2013.01); *H04L 1/18* (2013.01); *H04L 5/00* (2013.01);
(Continued)

(58) Field of Classification Search
None
See application file for complete search history.

(56) References Cited

U.S. PATENT DOCUMENTS 8,879,494 B2 * 11/2014 Dai .................. H04L 5/001
370/252
2011/0243087 A1 * 10/2011 Ahn .................. H04W 52/146
370/329

(Continued)

FOREIGN PATENT DOCUMENTS

WO    2011084020    7/2011

OTHER PUBLICATIONS

PCT International Application No. PCT/KR2015/013459, Written Opinion of the International Searching Authority dated Mar. 31, 2016, 25 pages.

(Continued)

*Primary Examiner* — Hong S Cho
(74) *Attorney, Agent, or Firm* — Lee Hong Degerman Kang & Waimey

(57) ABSTRACT

A method for a user equipment for reporting aperiodic channel status information in a carrier aggregation system according to one embodiment of the present invention is carried out by the user equipment and may comprise the steps of: receiving DCI, comprising a CSI request field, for approving a downlink from a base station; generating aperiodic CSI for a CSI measurement target included in a particular triggering set corresponding to the particular bit value of the CSI request field; and transmitting the generated aperiodic CSI to the base station.

14 Claims, 10 Drawing Sheets

(51) Int. Cl.
*H04L 5/00* (2006.01)
*H04L 1/00* (2006.01)
*H04L 1/18* (2006.01)
*H04W 72/04* (2009.01)
*H04W 88/02* (2009.01)
*H04W 88/08* (2009.01)

(52) U.S. Cl.
CPC .......... *H04L 5/0048* (2013.01); *H04L 5/0055* (2013.01); *H04W 72/044* (2013.01); *H04W 72/0406* (2013.01); *H04W 72/14* (2013.01); *H04W 88/02* (2013.01); *H04W 88/08* (2013.01)

(56) References Cited

U.S. PATENT DOCUMENTS

| | | | | |
|---|---|---|---|---|
| 2011/0249578 A1* | 10/2011 | Nayeb Nazar | ........ | H04L 1/0027 370/252 |
| 2012/0140708 A1* | 6/2012 | Choudhury | ......... | H04W 72/082 370/328 |
| 2012/0250541 A1* | 10/2012 | Ko | ........ | H04L 1/0026 370/252 |
| 2012/0320805 A1* | 12/2012 | Yang | ........ | H04L 1/18 370/280 |
| 2013/0114461 A1* | 5/2013 | Seo | ........ | H04L 1/1861 370/252 |
| 2013/0294352 A1* | 11/2013 | Park | ........ | H04B 7/024 370/328 |
| 2013/0343301 A1 | 12/2013 | Geirhofer et al. | | |
| 2014/0133418 A1* | 5/2014 | Takeda | ................ | H04W 72/042 370/329 |
| 2014/0198682 A1 | 7/2014 | Ko et al. | | |
| 2014/0341065 A1 | 11/2014 | Liao et al. | | |

OTHER PUBLICATIONS

Fujitsu, "Remaining issues for power control priority rules in dual connectivity", 3GPP TSG RAN WG1 Meeting #78bis, R1-143836, Oct. 2014, 3 pages.

* cited by examiner

METHOD FOR TERMINAL FOR REPORTING CHANNEL STATUS INFORMATION AND APPARATUS FOR THE METHOD IN WIRELESS COMMUNICATION SYSTEM SUPPORTING CARRIER AGGREGATION

CROSS-REFERENCE TO RELATED APPLICATIONS

This application is the National Stage filing under 35 U.S.C. 371 of International Application No. PCT/KR2015/013459, filed on Dec. 9, 2015, which claims the benefit of U.S. Provisional Application No. 62/089,258, filed on Dec. 9, 2014 and 62/204,455, filed on Aug. 13, 2015, the contents of which are all hereby incorporated by reference herein in their entirety.

TECHNICAL FIELD

The present invention relates to a wireless communication system, and more particularly, to a method for reporting channel status information through a user equipment in a wireless communication system supporting carrier aggregation and an apparatus for the method.

BACKGROUND ART

In a wireless cellular communication system, one base station controls data transmission and reception for a plurality of user equipments (UEs), and scheduling information on downlink data, for example, time/frequency information for data transmission and MCS (modulation and coding scheme) and HARQ (hybrid automatic retransmission request) related information are transmitted to a corresponding UE to allow the UE to receive data. Similarly, the base station notifies the corresponding UE of uplink scheduling information to allow the UE to transmit uplink data. Recently, CA (carrier aggregation) for transmitting downlink data to a single UE by aggregating unit component carrier (CC) has been considered to support a wider bandwidth while using band identification of the related art. Particularly, in the LTE standard, self-carrier scheduling and cross-carrier scheduling have been considered. In the self-carrier scheduling, each of a plurality of CCs transmits a control channel having scheduling information in a state that a plurality of CCs of different duplex modes or the same duplex mode are aggregated. In the cross-carrier scheduling, one of the plurality of CCs transmits a control channel having scheduling information of another CC. In the current LTE standard, CA for transmitting downlink data by aggregating 5 CCs has been considered. However, CA enhancement for transmitting downlink data by aggregating 5 or more CCs, for example, 8 or 16 CCs is recently considered to support traffic load which is rapidly increased.

DISCLOSURE

Technical Problem

Based on the aforementioned discussion, an object of the present invention is to provide a method for effectively reporting channel status information in a wireless communication system through a UE supporting carrier aggregation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A method for reporting aperiodic channel status information (CSI) through a user equipment (UE) in a carrier aggregation system, the method being carried out by the UE and comprising: receiving downlink control information (DCI) for uplink (UL) grant for requesting aperiodic CSI, from a base station; generating aperiodic CSI for CSI measurement targets triggered by the DCI for UL grant; and transmitting the generated aperiodic CSI to the base station.

Additionally or alternatively, the generated aperiodic CSI is transmitted through uplink (UL) CC corresponding to DL component carrier (CC) in which the DCI is received or DL CC scheduled by the DCI.

Additionally or alternatively, the UL CC corresponding to the DL CC in which the DCI is received or the DL CC scheduled by the DCI is indicated by a higher layer signal.

Additionally or alternatively, the DCI is received through each of first and second DL CCs, and if the first and second DL CCs correspond to UL CCs the same as each other, CSI associated with one of the first and second DL CCs, which has a high priority is transmitted.

Additionally or alternatively, the generated aperiodic CSI is transmitted through UL CC to which a physical uplink control channel (PUCCH), to which ACK/NACK (ACKnowledgement/Negative ACK) for a physical downlink shared channel (PDSCH) of the DL CC scheduled by the DCI is transmitted, is transmitted.

Additionally or alternatively, if the generated aperiodic CSI and periodic CSI collide with each other at UL subframe for transmitting the generated aperiodic CSI and PUCCH and PUSCH simultaneous transmission is unavailable, the periodic CSI is dropped.

Additionally or alternatively, if the generated aperiodic CSI and periodic CSI collide with each other at UL subframe for transmitting the generated aperiodic CSI and PUCCH and PUSCH simultaneous transmission is available, both the aperiodic CSI and the periodic CSI are transmitted.

Additionally or alternatively, if two aperiodic CSIs collide with each other at UL subframe for transmitting the aperiodic CSI, one of the two aperiodic CSIs, which is triggered more recently is transmitted.

Additionally or alternatively, if two aperiodic CSIs collide with each other at UL subframe for transmitting the aperiodic CSI, any one of the two aperiodic CSIs is transmitted when CSI measurement targets of the two aperiodic CSIs are the same as each other, whereas the two aperiodic CSIs are transmitted when the CSI measurement targets of the two aperiodic CSIs are different from each other.

Additionally or alternatively, the generated aperiodic CSI is transmitted using UL resource defined UE-specifically, and MCS (modulation coding scheme) and demodulation reference signal (DM-RS) cyclic shift (CS) configured previously.

Additionally or alternatively, the generated aperiodic CSI is transmitted using UL resource, MCS and DM-RS CS, which are most recently used for PUSCH transmission.

Additionally or alternatively, the generated aperiodic CSI is transmitted using UL resource, MCS and DM-RS CS, which are scheduled at UL subframe closest to a reception timing of the DCI after a specific time from the reception timing of the DCI passes.

Additionally or alternatively, the number of CSI processes included in the CSI measurement targets is limited to a specific reference value or less.

A user equipment (UE) configured to report aperiodic channel status information (CSI) in a carrier aggregation system, the UE comprising: a radio frequency (RF) unit; and a processor configured to control the RF unit, wherein the processor is configured to: receive downlink control information (DCI) for uplink (UL) grant for requesting aperiodic CSI, from a base station, generate aperiodic CSI for CSI measurement targets triggered by the DCI for UL grant, and transmit the generated aperiodic CSI to the base station.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a UE may efficiently report channel status information in a wireless communication system supporting carrier aggregation.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
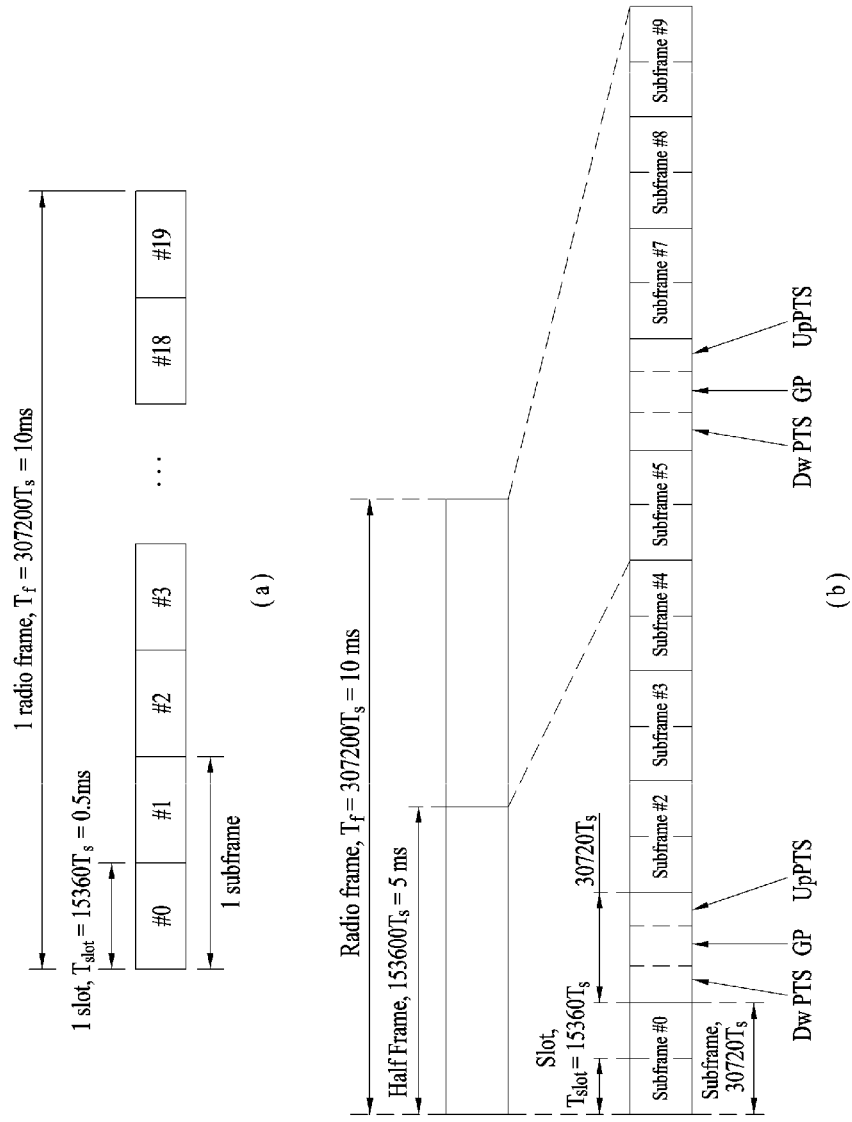
FIG. 1 is diagram illustrating an example of a radio frame structure used in a wireless communication system.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE) (that is, GERAN). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunication system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a reception device. In other words, the transmission device attempts to detect the presence of a carrier from another transmission device before attempting to perform transmission. Upon sensing the carrier, the transmission device waits for another transmission device which is performing transmission to finish transmission, before initiating transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission, and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the LTE/LTE-A based system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will later be described in detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH resource, respectively. Hereinafter, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe, and a subframe in which a synchronization signal (e.g., PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the terms CRS/UE-RS/CSI-RS/TRS ports may also be used to indicate a pattern of REs occupied by CRSs/UE-RSs/CSI-RSs/TRSs in a predetermined resource region.

FIG. 1 illustrates an example of a radio frame structure used in a wireless communication system.

Specifically, FIG. 1(a) illustrates an exemplary structure of a radio frame for frequency division multiplexing (FDD) used in a 3GPP LTE/LTE-A system, and FIG. 1(b) illustrates an exemplary structure of a radio frame for time division multiplexing (TDD) used in a 3GPP LTE/LTE-A system.

Referring to FIG. 1, the radio framed used in a 3GPP LTE/LTE-A system is 10 ms (307200$T_s$) in duration. The radio frame is divided into 10 subframes (SFs) of equal size. Subframe numbers may be assigned to the 10 subframes within one radio frame, respectively. In this case, $T_s$ denotes sampling time and is represented by $T_s=1/(2048*15 \text{ kHz})$. Each subframe is 1ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may be configured differently depending on duplex modes. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configuration of subframes within a radio frame in TDD mode.

TABLE 1

| DL-UL con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). The DwPTS is a time slot reserved for DL transmission and the UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS ee | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
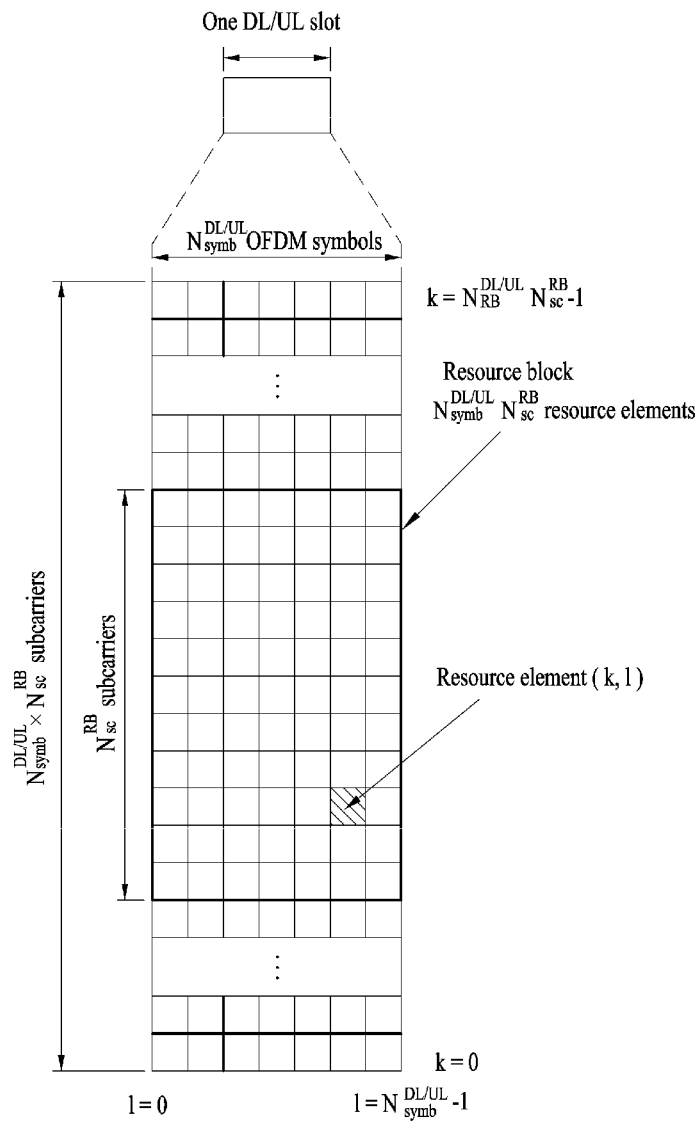
FIG. 2 is diagram illustrating an example of a downlink/uplink (DL/UL) slot structure in a wireless communication system.

FIG. 2 is a diagram illustrating a resource grid of a DL slot.

Although FIG. 2 illustrates that one DL slot includes 7 OFDM symbols in a time domain and one resource block (RB) includes 12 subcarriers in a frequency domain, the present invention is not limited to the example of FIG. 2. For example, in case of normal cyclic prefix (CP), one slot includes 7 OFDM symbols, however, in case of extended CP, one slot may include 6 OFDM symbols. One resource block (RB) includes 12×7 resource elements (REs). The number NDL of RBs included in the downlink slot depends on a downlink transmit bandwidth. The structure of a UL slot may be the same as that of the DL slot.

Figure 3:
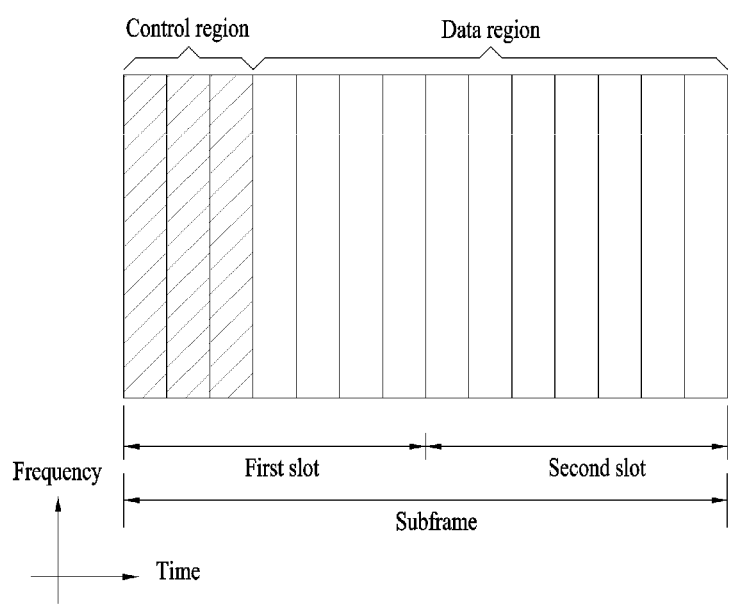
FIG. 3 is diagram illustrating an example of a downlink (DL) subframe structure used in a wireless communication system.

FIG. 3 illustrates a structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe correspond to the control region to which a control channel is allocated. Hereinafter, a resource region available for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols used for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) is referred to as DL scheduling information or DL grant. Transmit format and resource allocation information of an uplink shared channel (UL-SCH) is referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), and precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI ata bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A DCI format and the number of DCI bits are determined depending on the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region to which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured for rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH may be transmitted based on the demodulation RS (hereinafter, DMRS). Accordingly, the UE may decode/demodulate the PDCCH based on the CRS and decode/demodulate the EPDCCH based on the DMRS. The DMRS associated with the EPDCCH is transmitted on the same antenna port $p \in \{107, 108, 109, 110\}$ as the EPDCCH physical resource, is present for EPDCCH demodulation only if the EPDCCH is associated with the corresponding antenna port, and is transmitted only on the PRB(s) to which the EPDCCH is mapped.

Even in case of the DMRS for demodulation of the EPDCCH in the same manner as the UE-RS for demodulation of the PDSCH, if the type of the EPDCCH and the number of layers are equally applied to the DMRS, a certain number of REs per RB pair are used for DMRS transmission regardless of the UE or cell. Hereinafter, except for a case specific to the EPDCCH, the PDCCH and the EPDCCH will be referred to as PDCCH. The present invention may be applied to EPDCCH, PUSCH, and PDSCH and/or PUSCH scheduled by the EPDCCH as well as PDCCH, PUCCH, and PDSCH and/or PUSCH scheduled by the PDCCH.

In the 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. The SSs may have different sizes, and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). In this case, monitoring means attempting to decode each PDCCH in the corresponding SS in accordance with all monitored DCI formats. The UE may detect its PDCCH by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected. This process is referred to as blind detection (or blind decoding (BD)).

For example, it is assumed that a specific PDCCH is CRC-masked with a radio network temporary identity (RNTI) 'A' and information about data transmitted using a radio resource 'B' (e.g., frequency location) and using transport format information 'C' (e.g., transport block size, modulation scheme, coding information, etc.) is transmitted through a specific DL subframe. Then, the UE monitors the PDCCH using RNTI information thereof. The UE having the RNTI 'A' detects the PDCCH and receives the PDSCH indicated by 'B' and 'C' through information of the received PDCCH.

Generally, a DCI format which may be transmitted to the UE is varied depending on a transmission mode (TM) configured for the UE. In other words, for the UE configured for a specific transmission mode, not all DCI formats but some DCI format(s) corresponding to the specific transmission mode can be used. For example, the UE is semi-statically configured by higher layers so as to receive PDSCH data transmission, which is signaled through the PDCCH, in accordance with one of a plurality of transmission modes previously defined. To maintain operation load of the UE according to blind decoding attempt at a predetermined level or less, not all DCI formats are always simultaneously searched by the UE.

Figure 4:
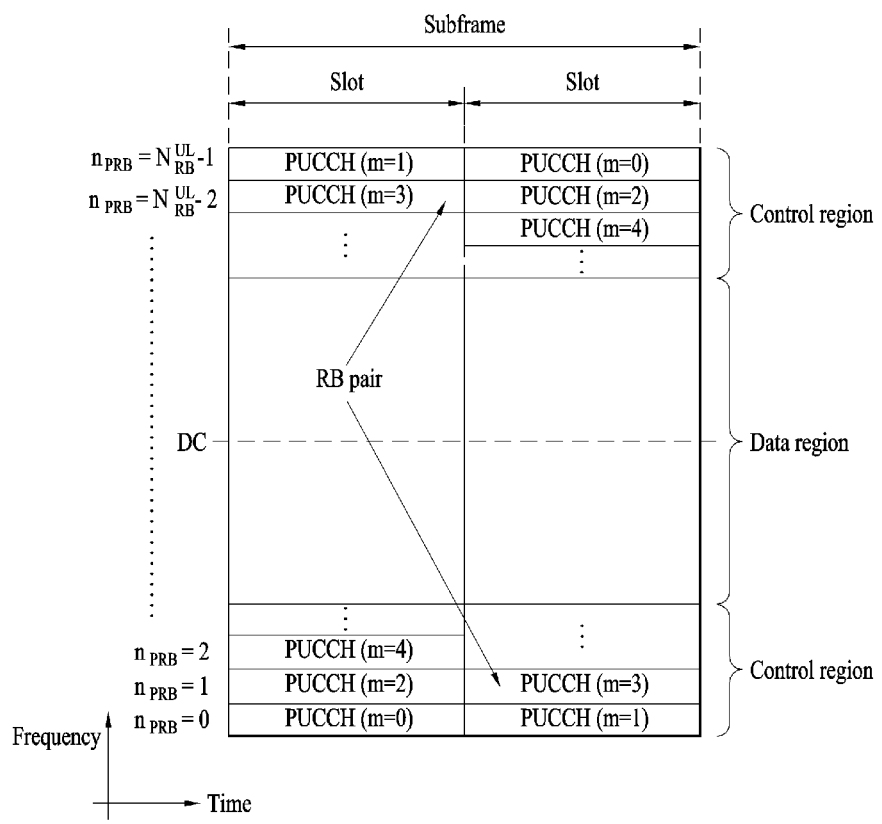
FIG. 4 is diagram illustrating an example of an uplink (UL) subframe structure used in a wireless communication system.

FIG. 4 illustrates an example of a structure of a UL subframe used in a wireless communication system.

Referring to FIG. 4, a UL subframe may be divided into a control region and a data region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Figure 5:
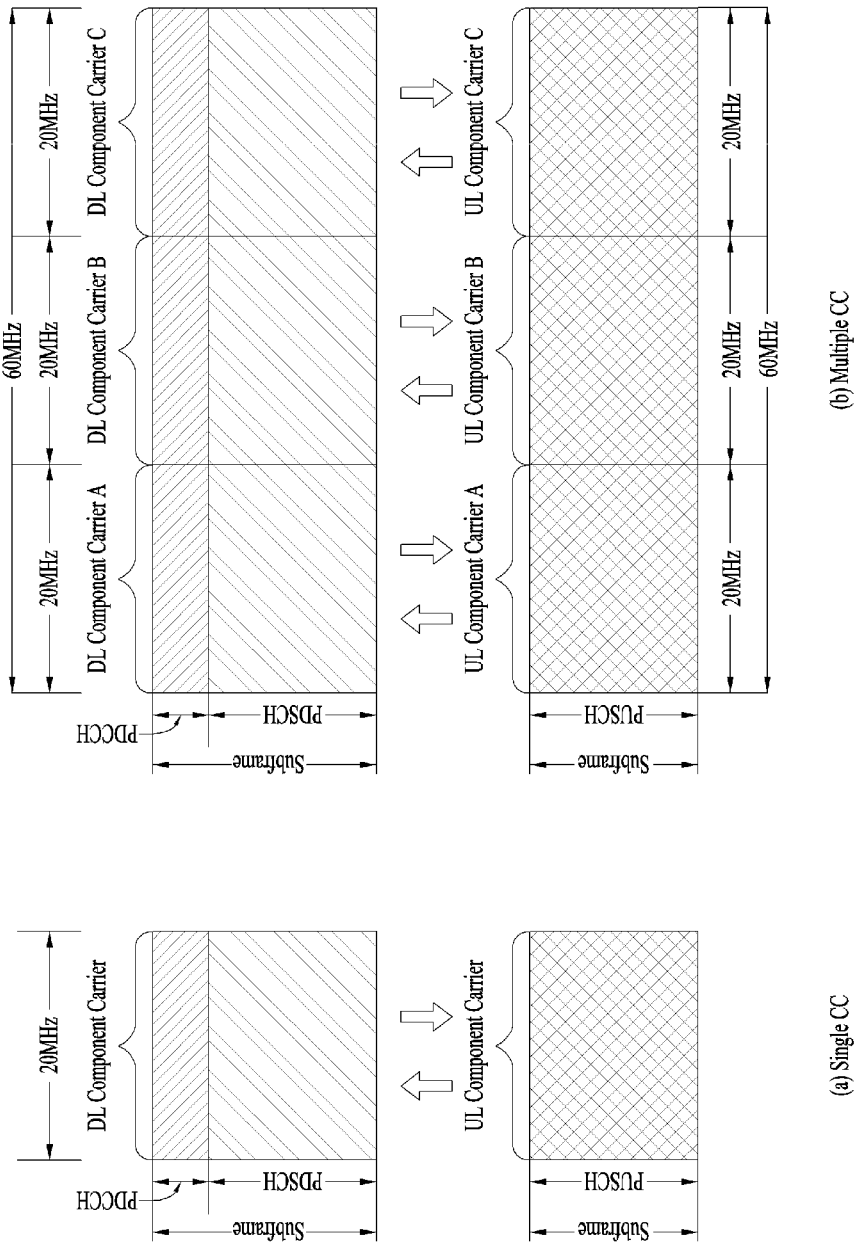
FIG. 5 is a diagram illustrating single carrier communication and multi-carrier communication.

FIG. 5 is a diagram illustrating single carrier communication and multi-carrier communication. Particularly, FIG. 5(a) illustrates a subframe structure of a single carrier, and FIG. 5(b) illustrates a subframe structure of multiple carriers.

Referring to FIG. 5(a), a general wireless communication system performs data transmission or reception through one downlink (DL) band and through one uplink (UL) band corresponding to the DL band (in case of a frequency division duplex (FDD) mode), or divides a predetermined radio frame into a UL time unit and a DL time unit in the time domain and then performs data transmission or reception through the UL/DL time unit (in case of a time division duplex (TDD) mode). Recently, to use a wider frequency band in wireless communication systems, the introduction of carrier aggregation (or bandwidth aggregation) technology that uses a wider UL/DL bandwidth by aggregating a plurality of UL and/or DL frequency blocks has been discussed. Carrier aggregation (CA) is different from an orthogonal frequency division multiplexing (OFDM) system in that DL or UL communication is performed using a plurality of carrier frequencies, whereas the OFDM system carries a basic frequency band divided into a plurality of orthogonal subcarriers on a single carrier frequency to perform DL or UL communication. Hereinafter, each of carriers aggregated by carrier aggregation will be referred to as a component carrier (CC). Referring to FIG. 5(b), three 20 MHz CCs may be aggregated on each of a UL and a DL to support a bandwidth of 60 MHz. The respective CCs may be contiguous or non-contiguous in the frequency domain. For convenience, although FIG. 5(b) illustrates that the bandwidth of UL CC and the bandwidth of DL CC are the same as each other and symmetric to each other, the bandwidth of each CC may be determined independently. Asymmetric carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of DL resources and UL resources, that is, combination of DL CC and UL CC. The cell may be configured by DL resources only, or may be configured by combination of DL resources and UL resources. If carrier aggregation is supported, linkage between a carrier frequency of the DL resources (or DL CC) and a carrier frequency of the UL resources (or UL CC) may be indicated by system information. For example, combination of the DL resources and the UL resources may be indicated by linkage of system information block type 2 (SIB2). In this case, the carrier frequency means a center frequency of each cell or CC. Hereinafter, a cell operating on a primary frequency will be referred to as a primary cell (Pcell) or PCC, and a cell operating on a secondary frequency will be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). The Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the S cell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

Figure 6:
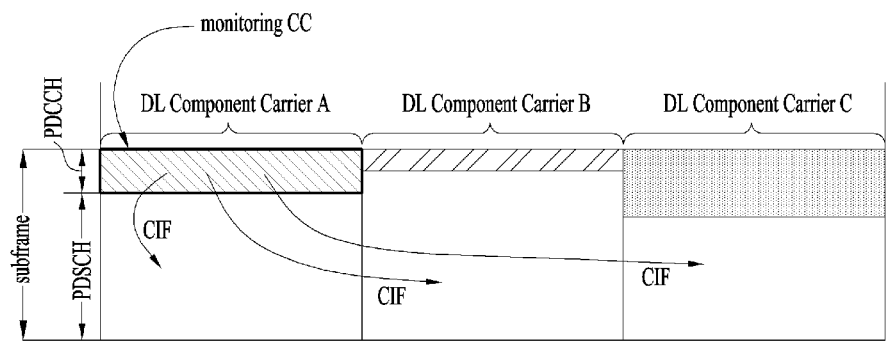
FIG. 6 is a diagram illustrating cross-carrier scheduling.

FIG. 6 is a diagram illustrating cross-carrier scheduling.

Cross-carrier scheduling means that a control region of any one DL CC of a plurality of serving cells includes downlink scheduling allocation information of the other DL CCs or a control region of any one DL CC of a plurality of serving cells includes uplink scheduling grant information on a plurality of UL CCs linked with the corresponding DL CC.

With respect to cross-carrier scheduling, a carrier indicator field (CIF) will be described. The CIF may be included in a DCI format transmitted through a PDCCH (for example, the CIF is defined at a 3-bit size) or not (for example, the CIF is defined at a 0-bit size). When the CIF is included in the DCI format, this represents that cross-carrier scheduling is applied. When cross-carrier scheduling is not applied, downlink scheduling allocation information is valid on a DL CC currently carrying the downlink scheduling allocation information. Also, uplink scheduling grant is valid on a UL CC linked with a DL CC carrying downlink scheduling allocation information.

When cross-carrier scheduling is applied, the CIF indicates a CC associated with downlink scheduling allocation information transmitted on a DL CC through a PDCCH. For example, referring to FIG. 11, downlink allocation information for DL CC B and DL CC C, that is, information about PDSCH resources is transmitted through a PDCCH in a control region on DL CC A. A UE can recognize PDSCH resource regions and the corresponding CCs through the CIF by monitoring DL CC A.

Whether or not the CIF is included in a PDCCH may be configured semi-statically, and may be enabled UE-specifically by higher layer signaling.

When the CIF is disabled, a PDCCH on a specific DL CC may allocate a PDSCH resource on the same DL CC and allocate a PUSCH resource on a UL CC linked with the specific DL CC. In this case, the same coding scheme, CCE based resource mapping and DCI formats as those used for the conventional PDCCH structure are applicable.

Meanwhile, when the CIF is enabled, a PDCCH on a specific DL CC may allocate a PDSCH/PUSCH resource on a DL/UL CC indicated by the CIF from among aggregated CCs. In this case, the CIF can additionally be defined in the existing PDCCH DCI formats. The CIF may be defined as a field having a fixed length of 3 bits, or a CIF position may be fixed irrespective of DCI format size. Even in this case, the same coding scheme, CCE based resource mapping and DCI formats as those used for the conventional PDCCH structure are applicable.

Figure 11:
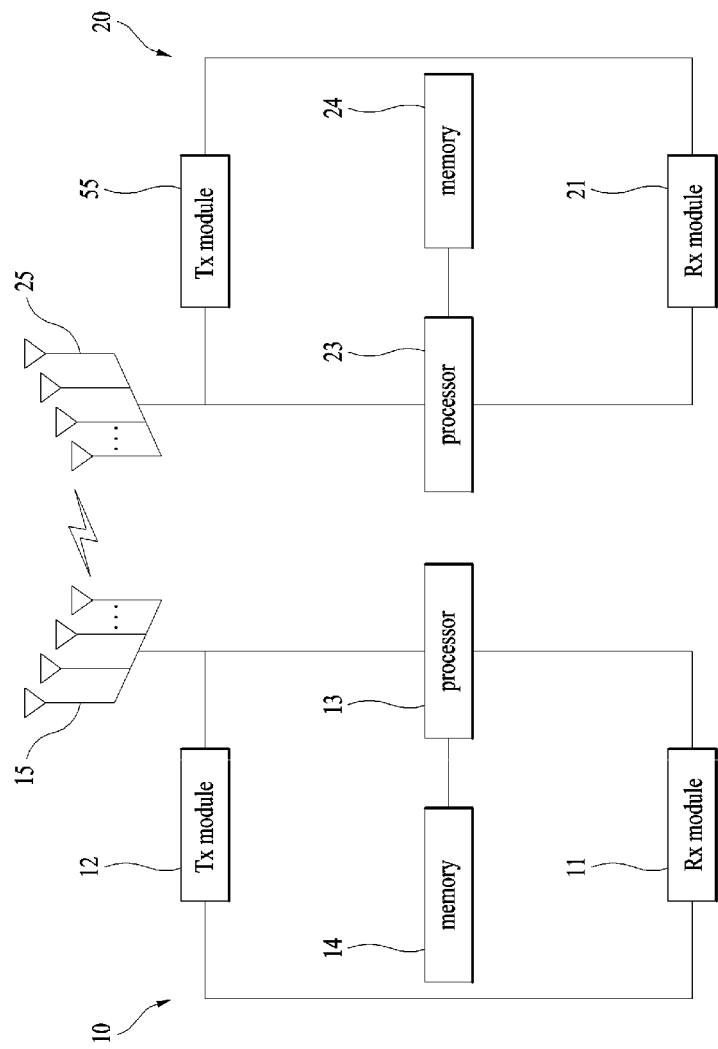
FIG. 11 is a diagram illustrating a preferred embodiment of a UE and a base station according to the present invention.

Even when the CIF is present, an eNB may allocate a DL CC set through which a PDCCH is monitored. Accordingly, blinding decoding overhead of a UE may be reduced. A PDCCH monitoring CC set is a part of aggregated DL CCs and a UE may perform PDCCH detection/decoding in the CC set only. That is, the eNB may transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 11, DL CC A may be configured as a PDCCH monitoring DL CC. When the CIF is disabled, a PDCCH on each DL CC can schedule only the PDSCH on DL CC A. Meanwhile, when the CIF is enabled, the PDCCH on DL CC A may schedule PDSCHs in other DL CCs as well as the PDSCH in DL CC A. When DL CC A is set as a PDCCH monitoring CC, no PDCCH may be transmitted to DL CC B and DL CC C.

Hereinafter, a method for configuring a resource period in a cell/carrier in which an available resource period is acquired or configured aperiodically or discontinuously in the same manner as an unlicensed band where exclusive usage of a specific system is not assured, and a UE operation accompanied with the method will be described.

Figure 7:
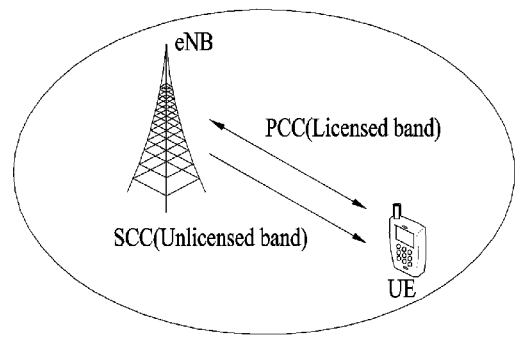
FIG. 7 is a diagram illustrating that a base station transmits a signal to a UE or vice versa under a carrier aggregation status of an LTE-A band which is a licensed band and an unlicensed band.

FIG. 7 is a diagram illustrating that a base station transmits a signal to a UE or vice versa under a carrier aggregation status of an LTE-A band which is a licensed band and an unlicensed band.

In the following description, for convenience of description of the present invention, it is assumed that a UE performs wireless communication in each of a licensed band and an unlicensed band through two component carriers as shown in FIG. 7. In this case, a carrier of the licensed band may be referred to as a primary component carrier (PCC or PCell) while a carrier of the unlicensed band may be referred to as a secondary component carrier (SCC or SCell).

However, the embodiments of the present invention may be applied to even the status that a plurality of licensed bands and a plurality of unlicensed bands are used by a carrier aggregation scheme. Also, the embodiments of the present invention may be applied to even the case that signal transmission and reception between an eNB and a UE is performed in an unlicensed band only. Also, the embodiments of the present invention may be applied to the other systems as well as the 3GPP LTE system.

In order that the eNB and the UE perform communication in the LTE-U band, since the corresponding band corresponds to an unlicensed spectrum, the corresponding band should be reserved/acquired for a specific time duration through contention with other communication (e.g., WiFi) system irrespective of the LTE (hereinafter, the time duration reserved/acquired for communication in the LTE-U band will be referred to as a reserved resource period (RRP)). Various methods may exist to acquire the RRP.

Typically, a method for transmitting a specific reservation signal to allow other communication system devices such as WiFi to recognize that a corresponding radio channel is reserved (busy) or continuously transmitting a reference signal (RS) and a data signal to transmit a signal of a specific power level or more without disconnection for a reserved resource period (RRP) is available.

In this way, if the eNB previously determines the RRP for reserving the LTE-U band, the eNB previously notifies the UE of the determined RRP to allow the UE to maintain a communication transmission/reception link for the corresponding indicated RRP.

As a method for notifying the UE of corresponding RRP information, the eNB may indicate corresponding RRP information through another CC (e.g., LTE-A band) linked in the form of carrier aggregation.

As another example of an unlicensed band operation operating in a contention based random access mode, the eNB may perform carrier sensing (CS) before performing data transmission and reception. The eNB checks whether a current channel state of the SCell is busy or idle. If it is determined that the current channel state is idle, the eNB may transmit control information (e.g., scheduling grant) through (E)PDCCH of the PCell (i.e., cross carrier scheduling, CCS) or through PDCCH of the SCell and attempt data transmission and reception.

At this time, the eNB may configure an RRP comprised of M consecutive subframes (SFs) (in this case, M is a natural number). In this case, a value of M and usage of the M subframes may previously be notified from the eNB to the UE through higher layer signaling (using PCell) or through a physical control/data channel. A start point of the RRP may be configured periodically (or semi-statically) by higher layer signaling. Alternatively, when the RRP start point is desired to be set to SF#n, the start point of the RRP may be designated through physical layer signaling at SF#n or SF#(n-k).

[Aperiodic PUSCH Feedback]

CSI (channel state information) feedback scheme in the LTE standard is categorized into periodic reporting through a PUCCH which is an uplink control channel and aperiodic reporting through a PUSCH which is an uplink data channel transmitted by a request of an eNB. The aperiodic reporting is configured for each UE by a request bit included in uplink scheduling information transmitted from the eNB to the UE, and if this information is received by each UE, each UE delivers channel information considering a transmission mode of each UE to the eNB through the PUSCH. In case of the periodic reporting, a period through which channel information is transmitted through a higher layer signal and offset at the corresponding period are signaled to each UE in a unit of subframe, and channel information considering a transmission mode of each UE is delivered to the eNB through the PUCCH in accordance with a given period. If data transmitted to the uplink exist simultaneously at a subframe for transmitting channel information in accordance with a given period, the corresponding channel information is transmitted through the uplink data channel (PUSCH) together with data not the uplink control channel (PUCCH).

Aperiodic PUSCH feedback of the channel information will be described in more detail. The aperiodic PUSCH feedback is categorized into six reporting modes in accordance with CQI and PMI feedback types as listed in Table 3. Each reporting mode will be described as follows.

[Aperiodic CSI Request]

In the current LTE standard, if a carrier aggregation (CA) environment is considered, a 2-bit CSI request field of a DCI format 0 or 4 is used to operate aperiodic CSI report. The UE construes the CSI request field as 2-bit if several serving cells exist in a CA environment. If one of transmission modes 1 to 9 is configured for all component carriers (CCs), aperiodic CSI report is triggered in accordance with the following Table 4, and if a transmission mode 10 is configured for at least one of the plurality of CCs, aperiodic CSI report is triggered in accordance with the following Table 5.

TABLE 4

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

TABLE 3

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | Mode 2-0 RI (only for Open-loop SM) 1st wideband CQI(4 bit) + Best-M CQI(2 bit) (Best-M CQI: CQI of M SBs selected from a total of N SBs) Best-M index (L bit) | | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
| | Higher Layer-configured (Subband CQI) | Mode 3-0 RI (only for Open-loop SM) 1st wideband CQI(4 bit) + N*subband CQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI (4 bit) (N is the total # of subbands) (if 8Tx Ant, N*subband W2 + wideband W1) |

TABLE 5

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

The present invention suggests a method for triggering aperiodic CSI report in CA of different duplex modes or one duplex mode, an operation of a UE, which has received the aperiodic CSI report triggering, for construing the aperiodic CSI report triggering, and a method for enabling the UE to transmit CSI report based on the aperiodic CSI report triggering through an uplink channel. Also, the present invention suggests a method for reporting periodic CSI report.

[Aperiodic CSI Triggering Based on DL Grant]

According to the current LTE standard, aperiodic CSI report is performed for CCs or CSI processes triggered from a CSI request field of DCI (DCI format 0/4) for UL grant, and the CSI report is performed through a PUSCH channel. If an aperiodic CSI report triggering system through DCI for DL grant (or DL allocation) is considered, the followings are suggested.

Aperiodic CSI report is transmitted through UL CC corresponding to DL CC to which DCI for DL grant is transmitted or a cell to which DCI for DL grant is transmitted. Alternatively, aperiodic CSI report is transmitted through UL CC corresponding to DL CC for scheduling DL grant or a cell for scheduling DL grant.

It is suggested that aperiodic CSI report triggered by DCI for DL grant is transmitted from CC to which PUCCH is transmitted. In more detail, aperiodic CSI report is transmitted through cell/CC configured to transmit ACK/NACK PUCCH corresponding to PDSCH of DL CC scheduled by DL grant.

For example, it is assumed that ACK/NACK PUCCH for PCC (primary CC) and SCC (secondary CC) 1 is transmitted to PCC and ACK/NACK PUCCH for SCC 2 and SCC 3 is transmitted to SCC 2. In this case, aperiodic CSI requested by DL grant for scheduling PCC or SCC 1 may be transmitted through PCC, and aperiodic CSI requested by DL grant for scheduling SCC 2 or SCC 3 may be transmitted through SCC 2.

If the number of DL CCs aggregated by CA is more than the number of UL CCs aggregated by CA, UL CC corresponding to DL CC to which DCI for DL grant is transmitted may not exist. In this case, when DCI for DL grant is transmitted per DL CC, UL CCs which will transmit aperiodic CSI report are respectively designated by a higher layer signal (e.g., RRC signal). Therefore, in a state that linkage between DL CC and UL CC is configured, if aperiodic CSI is requested through DL grant for specific DL CC, corresponding aperiodic CSI report may be transmitted through UL CC linked to the corresponding specific DL CC.

If two or more DL CCs collide with one UL CC, aperiodic CSI report is triggered in accordance with a higher priority of CCs (e.g., low index) based on a scheduled priority. This detailed example will be described with reference to FIG. 8.

Figure 8:
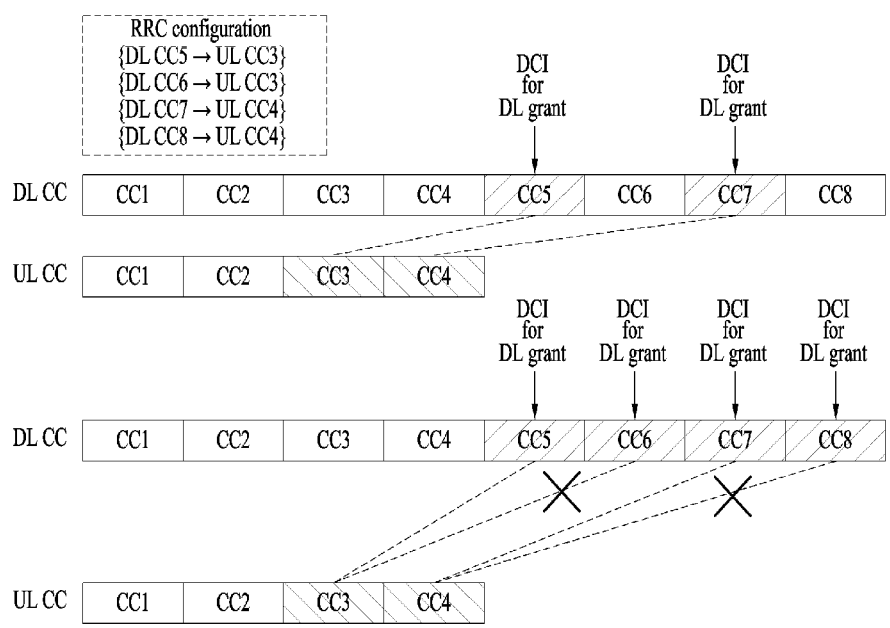
FIG. 8 is an exemplary diagram illustrating CSI triggering and report based on DL grant when the number of carrier aggregated DL CCs is more than the number of carrier aggregated UL CCs in accordance with the present invention.

FIG. 8 is an exemplary diagram illustrating CSI triggering and report based on DL grant when the number of carrier aggregated DL CCs is more than the number of carrier aggregated UL CCs in accordance with the present invention.

In FIG. 8, in a state that 8 DL CCs and 4 UL CCs are aggregated by CA, UL CCs 3, 3, 4, 4 are linked to DL CCs 5, 6, 7, 8.

In this case, if DCI for DL grant is transmitted through DL CCs 5 and 7 as shown in (a) of FIG. 8, aperiodic CSI report is triggered by DCI for DL grant transmitted through the DL CCs 5 and 7. In this case, the aperiodic CSI report may be transmitted through UL CCs 3 and 4.

For another example, if DCI for DL grant is transmitted through DL CCs 5, 6, 7, 8 as shown in (b) of FIG. 8, aperiodic CSI report is triggered by DCI for DL grant transmitted through the DL CCs 5 and 7, and aperiodic CSI report for DL CCs 6 and 8 is dropped. In this case, the aperiodic CSI report may be transmitted through UL CCs 3 and 4.

Similarly, even though UL CC corresponding to DL CC for scheduling DL grant does not exist, UL CCs which will transmit aperiodic CSI report are designed per DL CC by a higher layer signal (e.g., RRC signal).

Alternatively, if there is no UL CC corresponding to DL CC, the UE may not support aperiodic CSI triggering based on DL grant transmitted from the DL CC.

Triggering sets of DL CC, which are aperiodic CSI measurement targets, are configured independently (differently) for aperiodic CSI report triggered by DL grant and aperiodic CSI report triggered by UL grant. For example, in a system in which 16 DL CCs are aggregated by CA, CCs which will be included in the triggering set may be configured differently depending on whether the aperiodic CSI report is triggered by DL grant or UL grant as listed in Table 6. In the following, CC 1/CC 2 corresponding to a default state, that is, a case that a bit value of a CSI request field is "01", may be set to specific CCs previously designated by 1) CC to which DC for DL/UL grant is transmitted, 2) DL/UL CC scheduled from DL/UL grant, or 3) a higher layer signal.

TABLE 6

| CSI request bit field | CSI measurement target CCs during triggering based on DL grant | CSI measurement target CCs during triggering based on UL grant |
| --- | --- | --- |
| 00 | No aperiodic CSI report is triggered | No aperiodic CSI report is triggered |
| 01 | CC 1 | CC 2 |
| 10 | CC 3, 4, 5, 6 | CC 7, 8, 9, 10 |
| 11 | CC 11, 12, 13, 14 | CC 1, 2, 15, 16 |

If carrier aggregation of DL CC is available but carrier aggregation of UL CC is unavailable or there are a small number of cells/CCs in UL CCs aggregated by CA, the number of cells/CCs, which will transmit PUSCH including aperiodic CSI, becomes small, whereby triggering flexibility for CSI measurement target CCs/cells or CSI processes may be restrictive. Therefore, an aperiodic CSI request field may be introduced to DCI for DL grant, whereby aperiodic CSI may be triggered.

In this case, aperiodic CSI measurement target CCs or CSI processes configured through a higher layer signal may be configured independently (differently) per DL CC or cell group to which DCI for DL grant is transmitted.

Alternatively, aperiodic CSI measurement target CCs or CSI processes configured through a higher layer signal may be configured independently (differently) depending on a detection timing (e.g., subframe on which DCI for DL grant is transmitted) of DCI for DL grant.

Similarly, aperiodic CSI measurement target CCs or CSI processes configured through a higher layer signal may be configured independently (differently) depending on a subframe set in which a detection timing (e.g., subframe on which DCI for DL grant is transmitted) of DCI for DL grant is included.

If aperiodic CSI is triggered by DCI for DL grant, it may be required to define when corresponding aperiodic CSI report is transmitted.

In some embodiments, if aperiodic CSI is triggered by DL grant, the aperiodic CSI may be reported through an UL subframe closest to a reception timing of DL grant for triggering the corresponding aperiodic CSI, including/after x ms (e.g., x=4).

In some other embodiments, if aperiodic CSI is triggered by DL grant, the aperiodic CSI may be reported through an UL subframe closest to a reception timing of DL grant for triggering the corresponding aperiodic CSI, including/after x ms (e.g., x=4). At this time, if there is no UL subframe within y ms from the reception timing of DL grant, the corresponding aperiodic CSI transmission may be dropped.

In some embodiments, if aperiodic CSI transmission timing based on the defined rule collides with periodic CSI transmission timing, periodic CSI may always be dropped.

In some other embodiments, if PUCCH/PUSCH simultaneous transmission is unavailable, periodic CSI may be dropped. If PUCCH/PUSCH simultaneous transmission is configured, both aperiodic CSI and periodic CSI may be transmitted without drop of the periodic CSI.

If aperiodic CSI is triggered by DL grant, various methods how to transmit the corresponding aperiodic CSI may be determined.

If aperiodic CSI is triggered by DL grant, the corresponding aperiodic CSI may be transmitted using UL resource previously defined UE-specifically. Also, in this case, MCS (modulation coding scheme) and demodulation reference signal (DM-RS) cyclic shift (CS) previously configured/scheduled may be used.

Or, if aperiodic CSI is triggered by DL grant, the aperiodic CSI may be transmitted using the number of RBs and modulation order (e.g., QPSK), which are previously scheduled, in the same manner as uplink control information (UCI) on PUSCH without UL-SCH.

Or, if aperiodic CSI is triggered by DL grant, UL resource, MCS and DM-RS CS, which are most recently used for PUPSCH transmission, may be used for transmission of the corresponding aperiodic CSI.

Or, if aperiodic CSI is triggered by DL grant, the aperiodic CSI is transmitted using UL resource scheduled at the closest UL subframe including/after x ms.

If aperiodic CSI triggered by UL grant exists in the corresponding UL resource, the aperiodic CSI triggered by DL grant may be dropped.

Alternatively, if aperiodic CSI triggered by UL grant exists in the corresponding UL resource, the aperiodic CSI triggered by UL grant may be transmitted using a resource which is previously defined.

If UL subframe on which aperiodic CSI triggered by DL grant will be transmitted is the same timing as UL subframe on which aperiodic CSI triggered by UL grant will be transmitted, the triggered timings are compared with each other to select aperiodic CSI triggered by relatively late (latest) DL/UL grant, whereby the selected aperiodic CSI may be transmitted while aperiodic CSI transmission corresponding to DL/UL grant which is not selected may be dropped.

Or, if UL subframe on which aperiodic CSI triggered by DL grant will be transmitted is the same timing as UL subframe on which aperiodic CSI triggered by UL grant will be transmitted, the aperiodic CSI triggered by specific DL/UL grant may always first transmitted regardless of the triggered timing.

Or, if aperiodic CSI report target CCs/CSI processes triggered by DL grant are the same as those triggered by UL grant, one of the two reports may be selected, whereby the selected report may be transmitted. If not so, both the two reports may be transmitted at the same time.

The above suggestion may similarly be applied to even the case that UL subframes on which the respective aperiodic CSIs triggered by each of a plurality of UL grants will be transmitted correspond to the same timing as well as the case that UL subframe on which aperiodic CSI triggered by DL rant is the same timing as UL subframe on which aperiodic CSI triggered by UL grant will be transmitted. Moreover, the suggestion may similarly be applied to even the case that UL subframes on which the respective aperiodic CSIs triggered by each of a plurality of signals in addition to DL/UL grants will be transmitted correspond to the same timing.

[Limiting UE Processing Complexity]

According to the current LTE standard, the UE determines the number Nu of unreported CSI processes (or which are not fed back) corresponding to another (previous) CSI request with respect to one cell, at a subframe timing when CSI request for aperiodic CSI is received, and updates max (Nx-Nu, 0) lowest-indexed CSI processes. In this case, Nx is defined as the number of maximum CSI processes that may be supported by the UE when the corresponding cell is FDD serving cell or TDD serving cell and 4 CSI processes are configured for the UE. If the corresponding cell is TDD serving cell and 2 or 3 CSI processes are configured for the UE, Nx is defined as 3.

If a plurality of CCs and/or CSI processes are linked to each state corresponding to CSI request bit, through predefined signaling, the number of aperiodic CSI measurement target CSI processes that may be linked to one state may be configured to be restrictive. In more detail, the number of all aperiodic CSI measurement target CSI processes that may be linked to one state may be limited to a certain number or less, and/or the number of CSI processes per CC may be limited to a certain number or less.

Figure 9:
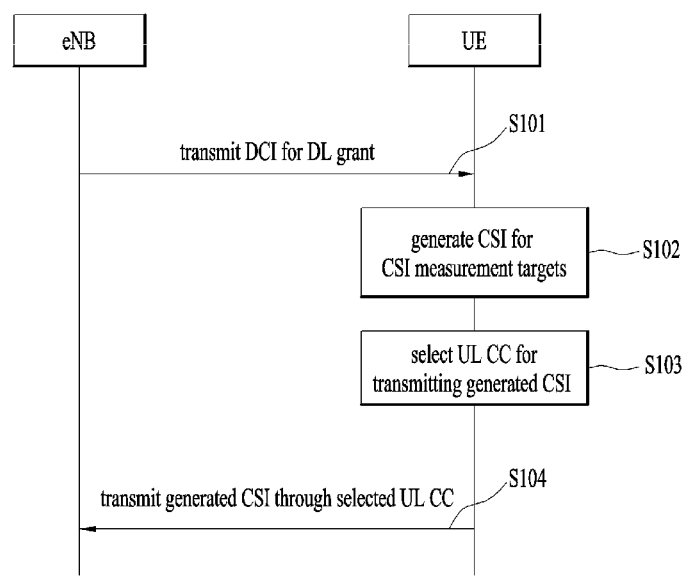
FIGS. 9 and 10 are diagrams illustrating an operation of a UE and a base station, which is related to a method for aperiodic CSI triggering and report according to the present invention.

FIG. 9 is a diagram illustrating an operation of a UE and an eNB, which is related to a method for aperiodic CSI triggering and report according to the present invention. FIG. 9 is an exemplary diagram illustrating a method for aperiodic CSI triggering and report, and technical spirits of the present invention are not limited to the example of FIG. 9.

Referring to FIG. 9, the eNB may transmit DCI for DL grant to the UE (S101). The DCI for DL grant may include a CSI request field. In this case, the CSI request field is a field for requesting the UE of aperiodic CSI report, and its bit(s) may be 1 bit or 2 bits, for example.

The UE that has received the DCI may generate aperiodic CSI for CSI measurement targets (e.g., a plurality of CCs, a plurality of CSI processes) included in a specific triggering set corresponding to a specific bit value of the CSI request field (S102).

Meanwhile, if aperiodic CSI report is triggered by DCI for DL grant, since UL CC for transmitting the generated aperiodic CSI is not scheduled unlike the case that aperiodic CSI report is triggered by DCI for UL grant, the UE may select UL CC for transmitting the generated aperiodic CSI (S103).

For example, the UE may transmit the generated aperiodic CSI to the eNB through UL CC corresponding to DL CC in which the DCI is received or DL CC scheduled by the DCI. The DL CC in which the DCI is received or DL CC scheduled by the DCI may be indicated by a higher layer signal.

Alternatively, the UE may transmit the generated aperiodic CSI to the eNB through UL CC to which ACK/NACK PUCCH for PDSCH of DL CC scheduled by the DCI is transmitted.

Afterwards, the UE may transmit the generated aperiodic CSI to the eNB through the selected UL CC (S104).

If the DCI for DL grant is received through first and second DL CCs different from each other and the first and second DL CCs correspond to (or are linked to) UL CCs the same as each other, that is, if UL CCs to which aperiodic CSI for each of the first and second DL CCs will be transmitted are selected as the same CCs, CSI associated with one of the first and second DL CCs, which has high priority, may be transmitted to the eNB. CSI associated with the other one of the first and second DL CCs, which has low priority, may be dropped.

As a detailed example, as shown in (b) of FIG. 8, if the DCI for DL grant is received through DL CCs 5 and 6, since the DL CCs 5 and 6 are linked to the same UL CC3, CSI associated with relatively low-indexed DL CC 5 may be transmitted to the eNB while CSI associated with relatively high-indexed DL CC 6 may be dropped.

In some embodiments, if the generated aperiodic CSI and periodic CSI collide with each other at a subframe on which the generated aperiodic CSI will be transmitted, the periodic CSI may be dropped when PUCCH and PUSCH simultaneous transmission is unavailable. Both the generated aperiodic CSI and the periodic CSI may be transmitted when PUCCH and PUSCH simultaneous transmission is available.

In some embodiments, if two aperiodic CSIs collide with each other at a subframe on which the aperiodic CSI will be transmitted, the aperiodic CSI, which is triggered more recently, of the two aperiodic CSIs, may be transmitted.

In some other embodiments, if two aperiodic CSIs collide with each other at a subframe on which the aperiodic CSI will be transmitted, any one of the two aperiodic CSIs may be transmitted when CSI measurement targets of the two aperiodic CSIs are the same as each other, whereas the two aperiodic CSIs may be transmitted when CSI measurement targets of the two aperiodic CSIs are different from each other.

The generated aperiodic CSI may be transmitted using UL resource defined UE-specifically, and MCS and DM-RS CS previously configured. Or, the generated aperiodic CSI may be transmitted using UL resource, MCS and DM-RS CS, which are most recently used for PUSCH transmission. Or, the aperiodic CSI may be transmitted using UL resource, MCS and DM-RS CS, which are scheduled at a UL subframe closest to a reception timing of the DCI after a specific time from the reception timing of the DCI passes.

Figure 10:
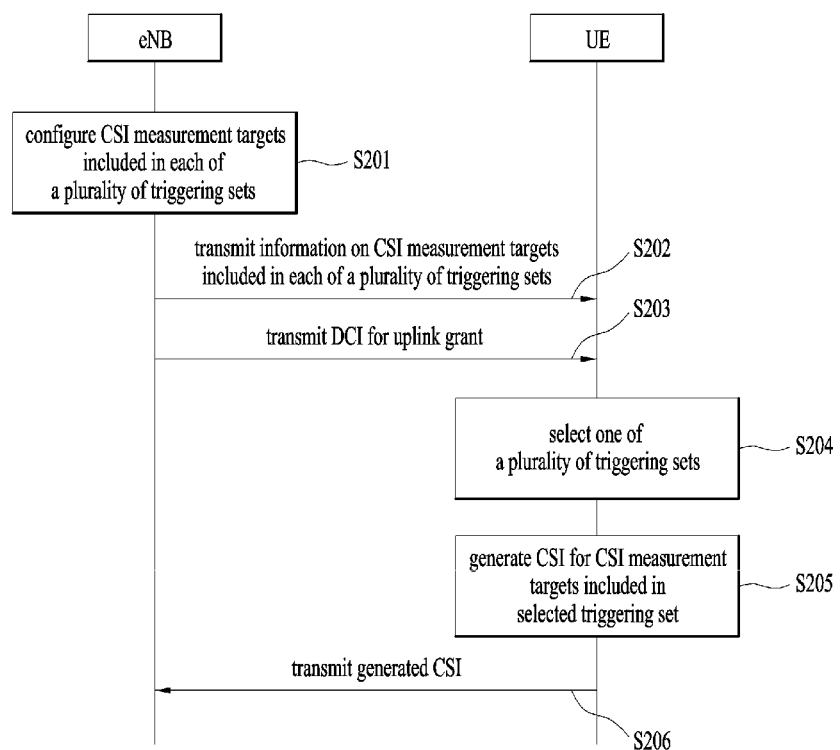

FIG. 10 is a diagram illustrating an operation of a UE and an eNB, which is related to a method for aperiodic CSI triggering and report according to the present invention. FIG. 10 is an exemplary diagram illustrating a method for aperiodic CSI triggering and report, and technical spirits of the present invention are not limited to the example of FIG. 10.

Referring to FIG. 10, the eNB may configure CSI measurement targets included in each of a plurality of triggering sets (S201).

In some embodiments, the CSI measurement targets included in each of the plurality of triggering sets may include at least one CC as listed in Table 6.

Meanwhile, at least two of the plurality of triggering sets may correspond to each of a plurality of bit values that may be owned by a CSI request field included in DCI. In a detailed example referring to Table 6, a first triggering set including CSI measurement target CC 1 and a second triggering set including CSI measurement target CC 2 may correspond to a bit value "01" of the CSI request field, a third triggering set including CSI measurement targets CC 3, 4, 5, 6, 7 and a fourth triggering set including CSI measurement targets CC 8, 9, 10, 11, 12 may correspond to a bit value "10" of the CSI request field, and a fifth triggering set including CSI measurement targets CC 11, 12, 13, 14 and a sixth triggering set including CSI measurement targets CC 1, 2, 15, 16 may correspond to a bit value "11" of the CSI request field.

The eNB may transmit information on CSI measurement targets included in each of the plurality of triggering sets to the UE (S202), and may transmit DCI including the CSI request field to the UE (S203). The DCI may be transmitted through a common search space (CSS), or may be transmitted through a UE-specific search space (USS). The DCI including the CSI request field may be DCI for UL grant or DL grant.

The UE that has received the DCI including the CSI request field may select one triggering set including CSI measurement targets, which will generate the CSI, among at least two triggering sets corresponding to a specific bit value owned by the CSI request field (S204).

The one triggering set may be selected in accordance with a specific reference. For example, the one triggering set may be selected considering whether the DCI is for UL grant or DL grant. As an example referring to Table 6, it is assumed that a bit value of the CSI request field is "01". In this case, if the aperiodic CSI is triggered by DCI for DL grant, the UE may select the first triggering set including CC 1 and report aperiodic CSI for CC 1. Unlike this, if the aperiodic CSI is triggered by DCI for UL grant, the UE may select the second triggering set including CC 2 and report aperiodic CSI for CC 2.

However, the selection reference of the triggering set is not limited to the aforementioned example. For example, the one triggering set may be selected considering DL CC in which the DCI is received, or may be selected considering a detection timing of the DCI, that is, DL subframe on which the DCI is received.

The UE may generate CSI for CSI measurement targets included in the selected triggering set (S205), and may transmit the generated CSI to the eNB (S206).

FIG. 11 is a diagram illustrating a preferred embodiment of a UE and an eNB according to the present invention.

Referring to FIG. 11, an eNB 10 according to the present invention may include an Rx module 11, a Tx module 12, a processor 13, a memory 14, and a plurality of antennas 15. The Rx module 11 may receive various signals, data, and information from an external device (e.g., UE). The Tx module 12 may transmit various signals, data, and information to the external device (e.g., UE). The processor 13 may control an overall operation of the eNB 10. The existence of the plurality of antennas 15 mean that the eNB 10 supports MIMO transmission and reception.

The eNB 10 according to an embodiment of the present invention may be configured to request and receive aperiodic channel status information report in a carrier aggregation system. The processor 13 may configure CSI measurement targets included in each of a plurality of triggering sets, transmit information on the CSI measurement targets included in each of the plurality of triggering sets to the UE 20, transmit DCI for UL grant including a CSI request field to the UE 20, and control the Tx module 12 to receive CSI generated by the UE 20. In addition, the processor 13 of the eNB 10 processes information received by the eNB 10, information to be transmitted to the outside, etc. The memory 14 may store the processed information for a predetermined time and may be replaced by an element such as a buffer (not shown).

Referring to FIG. 11, the UE 20 according to an embodiment of the present invention may include an Rx module 21, a Tx module 22, a processor 23, a memory 24, and a plurality of antennas 25. The Rx module 21 may receive various signals, data, and information from an external device (e.g., eNB). The Tx module 22 may transmit various signals, data, and information to the external device (e.g., eNB). The processor 23 may control an overall operation of the UE 20. The existence of the plurality of antennas 25 means that the UE 20 supports MIMO transmission and reception.

The UE 20 according to an embodiment of the present invention may be configured to report aperiodic channel status information in a carrier aggregation system. The processor 23 may receive DCI for UL grant including a CSI request field, generate aperiodic CSI for CSI measurement targets (e.g., a plurality of CCs and/or a plurality of CSI processes) included in a specific triggering set corresponding to a specific bit value owned by the CSI request field, and control the Tx module 22 to transmit the generated aperiodic CSI to the eNB 10. The processor 23 of the UE 20 processes information received by the UE 20, information to be transmitted to the outside, etc. The memory 24 may store the processed information for a predetermined time and may be replaced by an element such as a buffer (not shown).

The detailed configurations of the eNB 10 and the UE 20 as described above may be implemented such that details of the various embodiments described above are independently applied or two or more embodiments are simultaneously applied. Redundant description is omitted.

Also, in describing the various embodiments of the present invention, the eNB has been exemplarily described as a downlink transmission entity or an uplink reception entity, and the UE has been exemplarily described as a downlink reception entity or an uplink transmission entity. However, the scope of the present invention is not limited thereto. For example, the description of the eNB given above may be equally applied to a case that a cell, an antenna port, an antenna port group, an RRH, a transmission point, a reception point, an access point, and a relay serve as a downlink transmission entity or an uplink reception entity with respect to the UE. In addition, the principle of the present invention described above through various embodiments may be equally applied to a case that a relay serves as a downlink transmission entity or an uplink reception entity with respect to the UE or to a case that the relay serves as an uplink transmission entity or a downlink reception entity with respect to the eNB.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned various embodiments of the present invention may be applied to various mobile communication systems.

What is claimed is:

1. A method for reporting aperiodic channel status information (CSI) by a user equipment (UE) in a wireless communication system supporting carrier aggregation of a plurality of downlink component carriers (DL CCs) and at least one uplink component carrier (UL CC), the method comprising:

receiving a radio resource control (RRC) signal from a base station, each of the plurality of DL CCs being linked to a UL CC for reporting the aperiodic CSI based on the RRC signal;

receiving downlink control information (DCI) for downlink (DL) grant from a base station, the DCI triggering the aperiodic CSI and scheduling a physical downlink shared channel (PDSCH) transmission; and transmitting the aperiodic CSI to the base station on the UL CC linked to a DL CC receiving the DCI, wherein, when the DCI is received on different DL CCs and the different DL CCs are linked to a same UL CC based on the RRC signal, the aperiodic CSI triggered by the DCI received on a DL CC having a lower index from among the different DL CCs is transmitted to the base station, and the aperiodic CSI triggered by the DCI received on a DL CC having a higher index from among the different DL CCs is dropped.

2. The method according to claim 1, wherein the aperiodic CSI is transmitted through a physical uplink control channel (PUCCH) transmitting acknowledgement/negative acknowledgement (ACK/NACK) information for the PDSCH transmission.

3. The method according to claim 1, wherein, when the aperiodic CSI and periodic CSI collide with each other in a UL subframe for transmitting the aperiodic CSI and a PUCCH and PUSCH simultaneous transmission is unavailable, the periodic CSI is dropped.

4. The method according to claim 1, wherein, when the aperiodic CSI and periodic CSI collide with each other in a UL subframe for transmitting the aperiodic CSI and a PUCCH and PUSCH simultaneous transmission is available, both the aperiodic CSI and the periodic CSI are transmitted.

5. The method according to claim 1, wherein the aperiodic CSI is transmitted using a UL resource defined UE-specifically, and a modulation coding scheme (MCS) and a demodulation reference signal (DM-RS) cyclic shift (CS) configured previously.

6. The method according to claim 1, wherein the aperiodic CSI is transmitted using a UL resource, a MCS and a DM-RS CS, which were most recently used for a PUSCH transmission.

7. The method according to claim 1, wherein the aperiodic CSI is transmitted using a UL resource, a MCS and a DM-RS CS, which were scheduled at a UL subframe closest to a reception timing of the DCI after a specific time from the reception timing of the DCI lapses.

8. A user equipment (UE) configured to report aperiodic channel status information (CSI) in a wireless communication system supporting carrier aggregation of a plurality of downlink component carriers (DL CCs) and at least one uplink component carrier (UL CC), the UE comprising:

a radio frequency (RF) unit; and a processor configured to control the RF unit, wherein the processor is configured to:

receive a radio resource control (RRC) signal from a base station, each of the plurality of DL CCs being linked to a UL CC for reporting the aperiodic CSI based on the RRC signal, receive downlink control information (DCI) for downlink (DL) grant from a base station, the DCI triggering the aperiodic CSI and scheduling a physical downlink shared channel (PDSCH) transmission, and transmit the aperiodic CSI to the base station on the UL CC linked to a DL CC receiving the DCI, wherein, when the DCI is received on different DL CCs and the different DL CCs are linked to a same UL CC based on the RRC signal, the aperiodic CSI triggered by the DCI received on a DL CC having a lower index from among the different DL CCs is transmitted to the base station, and the aperiodic CSI triggered by the DCI received on a DL CC having a higher index from among the different DL CCs is dropped.

9. The UE according to claim 8, wherein the aperiodic CSI is transmitted through a physical uplink control channel (PUCCH) transmitting acknowledgement/negative acknowledgement (ACK/NACK) information for the PDSCH transmission.

10. The UE according to claim 8, wherein, when the aperiodic CSI and periodic CSI collide with each other in a UL subframe for transmitting the aperiodic CSI and a PUCCH and PUSCH simultaneous transmission is unavailable, the periodic CSI is dropped.

11. The UE according to claim 8, wherein, when the aperiodic CSI and periodic CSI collide with each other in a UL subframe for transmitting the aperiodic CSI and a PUCCH and PUSCH simultaneous transmission is available, both the aperiodic CSI and the periodic CSI are transmitted.

12. The UE according to claim 8, wherein the aperiodic CSI is transmitted using a UL resource defined UE-specifically, and a modulation coding scheme (MCS) and a demodulation reference signal (DM-RS) cyclic shift (CS) configured previously.

13. The UE according to claim 8, wherein the aperiodic CSI is transmitted using a UL resource, a MCS and a DM-RS CS, which were most recently used for a PUSCH transmission.

14. The UE according to claim 8, wherein the aperiodic CSI is transmitted using a UL resource, a MCS and a DM-RS CS, which were scheduled at a UL subframe closest to a reception timing of the DCI after a specific time from the reception timing of the DCI lapses.

* * * * *